United States Patent [19]

Calderon

[11] 4,072,299
[45] Feb. 7, 1978

[54] METHOD AND APPARATUS FOR BASIC OXYGEN STEEL MAKING EMPLOYING THE OFF-GAS PRINCIPLE OF PRE-HEATING PURPOSES

[76] Inventor: Albert Calderon, 1065 Melrose Drive, Bowling Green, Ohio 43402

[21] Appl. No.: 680,757

[22] Filed: Apr. 27, 1976

[51] Int. Cl.$^2$ .............................................. C21C 5/40
[52] U.S. Cl. ..................................... 266/44; 266/142; 266/158
[58] Field of Search ................. 266/44, 142, 143, 158, 266/245; 122/7 A

[56] References Cited

U.S. PATENT DOCUMENTS

| | | | |
|---|---|---|---|
| 3,434,705 | 3/1969 | Pere | 266/158 |
| 3,533,612 | 10/1970 | Morton | 266/245 |
| 3,809,376 | 5/1974 | Plazier | 266/158 |
| 3,863,906 | 2/1975 | Vicard | 266/158 |

FOREIGN PATENT DOCUMENTS 1,312,160  11/1962  France ................. 266/158

Primary Examiner—Gerald A. Dost

[57] ABSTRACT

The improvement in method and apparatus for basic oxygen steel making employing the off-gas principle for pre-heating purposes. This improvement involves the directing of the off-gas from a first furnace during refining to a second furnace, and burning said off-gas within the second furnace efficiently in order to preheat scrap and/or iron pellets in order to decrease the charge of molten pig iron and increase the solid charge. At the conclusion of the refining portion of the cycle, said first furnace is emptied of its steel and the cold charge is introduced into it while molten pig iron is charged into said second furnace on top of the pre-heated scrap. The cycle is then reversed by refining in said second furnace and directing said off-gas to said first furnace where it is mixed with oxygen or air and burnt within it to provide energy for the pre-heat. The method and apparatus provide for the protection of the lining and gives consideration to maintenance and pollution control. This improvement makes use of the off-gas which is generally wasted and in this manner conserves an appreciable amount of energy.

24 Claims, 9 Drawing Figures

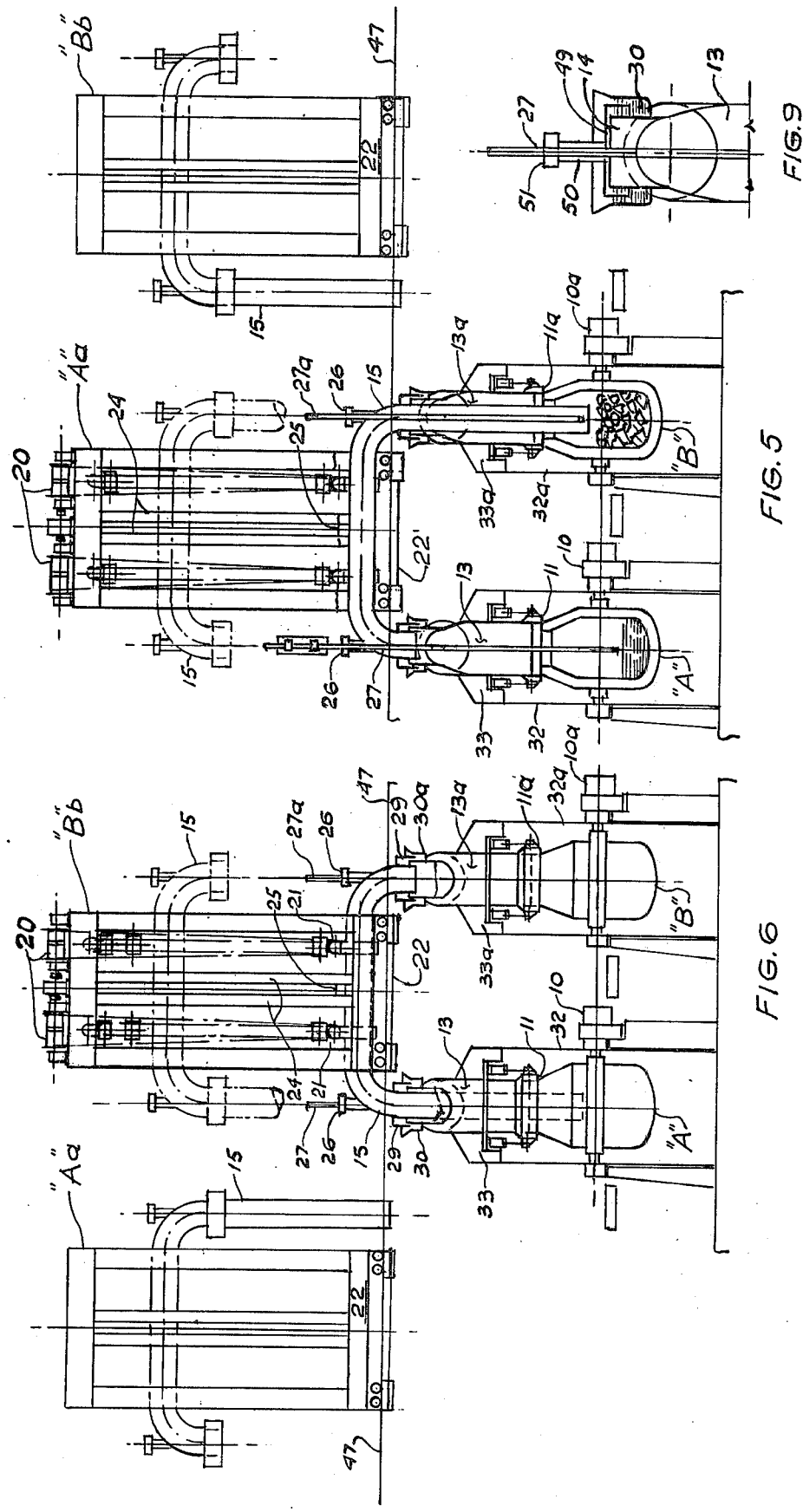

METHOD AND APPARATUS FOR BASIC OXYGEN STEEL MAKING EMPLOYING THE OFF-GAS PRINCIPLE OF PRE-HEATING PURPOSES

The present invention is an improvement of the two patent applications of Albert Calderon, present applicant, filed in the U.S. Patent Office on Dec. 19, 1960 and on Mar. 17, 1961, and having Ser. No. 76,732 and Ser. No. 96,414 respectively. The applications were abandoned for the reasons which follow, but before abandonment a patent was issued in France bearing number 1,312,160 based on said applications, to Calderon Automation, Inc. and a copy of which being attached herewith. From said patent applications and from the French patent, it is evident that the applicant recognized the importance of making use of the off-gas for the pre-heating of scrap outside the basic oxygen furnace or within the furnace itself many years ago. From the time that said applications were filed, the applicant off and on attempted to solve the problems which have prevented the use of the off-gas for pre-heating which was described in detail in said applications and said issued French patent. In one of said applications the pre-heating of scrap was taught by providing means outisde the steel making furnace and in the other patent application the preheating of scrap was taught by the employment of dual furnaces to perform this function, with one furnace refining and the second pre-heating with the provision for reversal so that the preheating takes place in the one in which steel was refined and the refining taking place in the other in which scrap was pre-heated. Both applications were combined before filing in France and it is for this reason that the French patent teaches both the pre-heating outside and the pre-heating within the furnace in a single issue.

The pre-hearing of scrap outside the furnace by means of the off-gas encountered the following major problems:
(1) Heat loss, and
(2) The handling and charging of the hot scrap after preheating.

The pre-heating of scrap within the furnace by means of the off-gas encountered the following problems:
(1) The introduction of the burnt off-gas into the furnace was found to be inefficient as presented and shown by FIG. 14 in the said issued French patent of applicant's.
(2) The lining of the furnace would be subjected to excessive abuse from heat, this being based on experience from the Kaldo process.
(3) No consideration was given for maintenance.
(4) Provisions for relining were cumbersome.

In both pre-heating outside the furnace or within the furnace described in said applications and issued patent, no consideration was given to pollution control. With the above problems in view the applicant decided to completely abandon the pre-heating outside the furnace and concentrate on pre-heating within the furnace and overcome the problems mentioned.

Before proceeding with the disclosure further, briefly, the basic oxygen steelmaking process currently practiced, comprises the charging of 30% of scrap and 70% of molten pig iron while the furnace is reclined and the rotating of the furnace to its vertical position so that the mouth of the furnace is under a hood. An oxygen lance is lowered through the hood into the furnace and pure oxygen is blown at high velocity while additives are introduced into the furnace generally during the initial phase of the blowing of the oxygen. The oxygen reaction with the silicon, manganese, phosphorus, sulphur and carbon in the molten pig iron renders the reaction exothermic to such an extent as to melt the 30% scrap. During the blowing appreciable amounts of CO are released into the hood and it is this released gas which is very hot and possesses fuel value, known as the basic oxygen "off-gas". In many shops the off-gas is burned at the hood by the aspiration of air changing the CO to $CO_2$. In some shops, and particularly abroad, air is prevented from being aspirated into the hood and the gas is directed to a collection means for use to fire boilers or flared. Even though the basic oxygen steel making process is efficient from the standpoint of refining steel, its main disadvantage is that it is not flexible from the standpoint of using a bigger percentage of scrop despite the fact that it generates an appreciable amount of heat in the reaction as evidenced by the tremendous release of energy in the hood.

It is gratifying for the applicant to know that finally the urgency of using the great losses of energy at the mouth of the basic oxygen steel making furnace is being recognized as evidenced by the Battelle Research Organization's Report Publication #PB-244097 titled "Potential for Energy Conservation in the Steel Industry" prepared for the Federal Energy Administration dated May 30, 1975 pages V-45 through V-51. The applicant has for years appreciated the value of this waste of energy, evidenced by said applications and issued French patent, and the instant application is an improvement over that which he conceived more than fifteen years ago and which is now presented as an improvement for practical application and utilization of this sizeable and substantial energy.

With the above factors under consideration and with the goal of energy conservation for putting into good use the off-gas emitted from a basic oxygen steelmaking furnace during refining, the main object of this invention is to provide a practical and efficient method of and apparatus for conserving energy by making use of the off-gas by the employment of dual furnaces in which the refining takes place in one first furnace while simultaneously the pre-heating of scrap takes place in the second. This is accomplished by directing the off-gas from said first furnace to said second furnace and burning the off-gas in this second furnace in an efficient manner to pre-heat scrap and/or pellets which was charged into it prior to the commencing of refining in said first furnace.

Another object of the instant invention is the guaranteeing of the directing of the off-gases from said first furnace in which the refining takes place to said second furnace in which the preheating takes place so that substantially all of the off-gas goes from said first furnace to said second furnace and burns efficiently within said second furnace.

Still another object of the instant invention is to provide means for interconnecting said first furnace with said second furnace by means of a water-cooled gas-duct preferably in the form of an inverted J hereinafter referred to as "J-duct", having a short leg and a long leg with a sizeable diameter in the long leg in order to provide wide flame coverage for pre-heating efficiently in said second furnace, said J-duct being disposed with the short leg over the furnace in which the refining takes place and the long leg within the furnace in which the pre-heating takes place.

Yet an object of this invention is to provide for the long leg of said J-duct to be introduced into said second furnace where the pre-heating of scrap takes place in such a manner that the outlet thereof is positioned above the scrap at such a height as to give the maximum efficiency for burning the off-gas.

Therefore, an object of this invention is to introduce oxygen into said first furnace for refining purposes through the short leg of said J-duct and either air or oxygen but preferably oxygen through the long leg of said J-duct into said second furnace in order to provide means for oxidizing within said second furnace the off-gas generated in said first furnace and directed to second furnace.

It is another object of this invention to provide means for raising and lowering said J-duct in order to apply the heat to the scrap charge in the most efficient manner and bore into the scrap so that the heat of combustion is not detrimental to the lining of the furnace during pre-heat.

It is yet an object of this invention to introduce the cold charge into said first furnace after the completion of the refining of the steelmaking and the tapping of the heat in a ladle from said first furnace, and the introduction of the molten charge of pig iron into said second furnace where pre-heat had taken place during the previous refining or blow, and to provide means for reversing the interconnection between said two furnaces so that refining takes place in said second furnace while pre-heating in said first furnace, this reversal being accomplished by having the long leg of said J-duct within said first furnace and the short leg of said J-duct over said second furnace.

It is therefore an object of this invention to provide two J-ducts with the long legs thereof or the short legs thereof positioned adjacently to each other so that the reversal from refining to pre-heating or from pre-heating to refining, takes place by selectively using either one of said J-ducts in order to direct the off-gas from said first furnace to said second furnace or from said second furnace to said first furnace depending upon the function being refining or pre-heating.

Yet another object of this invention is to mount said two J-ducts on separate overhead transporting carriages equipped with hoisting means in order to make possible the rapid reversal of the off-gas from said first furnace to said second furnace and from said second furnace to said first furnace.

It is yet another object of this invention to provide guiding means within each of said carriages in order to guide said J-duct into and out of said furnaces to effect proper positioning.

It is therefore another object of this invention to blow oxygen or air into said furnaces either from the top through the employment of lance means or from the bottom thereof.

It is further yet an object of this invention to provide water seals to limit the aspiration of outside air into the system.

It is therefore further yet, another object of this invention to seal the entry point of said J-duct into the hood over the refining furnace by means of a cover in order to isolate any of said furnaces for relining purposes and side-stepping the preheating process during the relining period.

Therefore still, another object of this invention is to provide pollution control means during the charging, the tapping and the slagging of either said first or said second furnace by providing a plenum under suction and the charging of both the scrap and the molten pig iron being performed independently of crane means by means of apparatus equipped with reach so that the charging of both scrap and molten pig iron takes place completely under said plenum to eliminate fugitive emissions.

It is still another object of this invention to locate both said first and second furnaces well within a furnace aisle so that said furnaces are at all times under suction hoods during blowing, refining, charging, sample taking, temperature taking, tapping and slagging.

Further still another object of this invention is to provide clearance means for said overhead transporting carriages for said J-ducts so that interference with oxygen lance means is obviated.

Other objects of this invention will appear from the following detailed drawings and appended claims. Reference is made to the accompanying drawings forming a part of this specification wherein like reference characters designate corresponding parts in the various views.

BRIEF DESCRIPTION OF DRAWINGS

FIG. 5 is a frontal elevation partially sectionalized showing furnace "A" in refining and furnace "B" in pre-heat, with carriage "A$a$" for J-duct overhead. A second overhead carriage "B$b$" for the other J-duct parked to the right is in position for reversal of off-gas from "B" to "A".

FIG. 6 is a frontal elevation showing furnace "B" in the refining process and furnace "A" in pre-heat, with carriage "B$b$" for J-duct overhead. A second overhead carriage "A$a$" for the other J-duct parked to the left is in position for reversal of off-gas from "A" to "B".

FIG. 9 is a partial view in section showing a cover for the hood used during reline when no pre-heating takes place.

Before explaining in detail the present invention, it is to be understood that the invention is not limited to its application of details of construction and arrangement of the parts illustrated on the accompanying drawings since the invention is capable of other embodiments. Also, it is to be understood that the phraseology or terminology employed herein is for the purpose of description and not limitation.

DETAILED DESCRIPTION OF DRAWINGS

Figure 1:
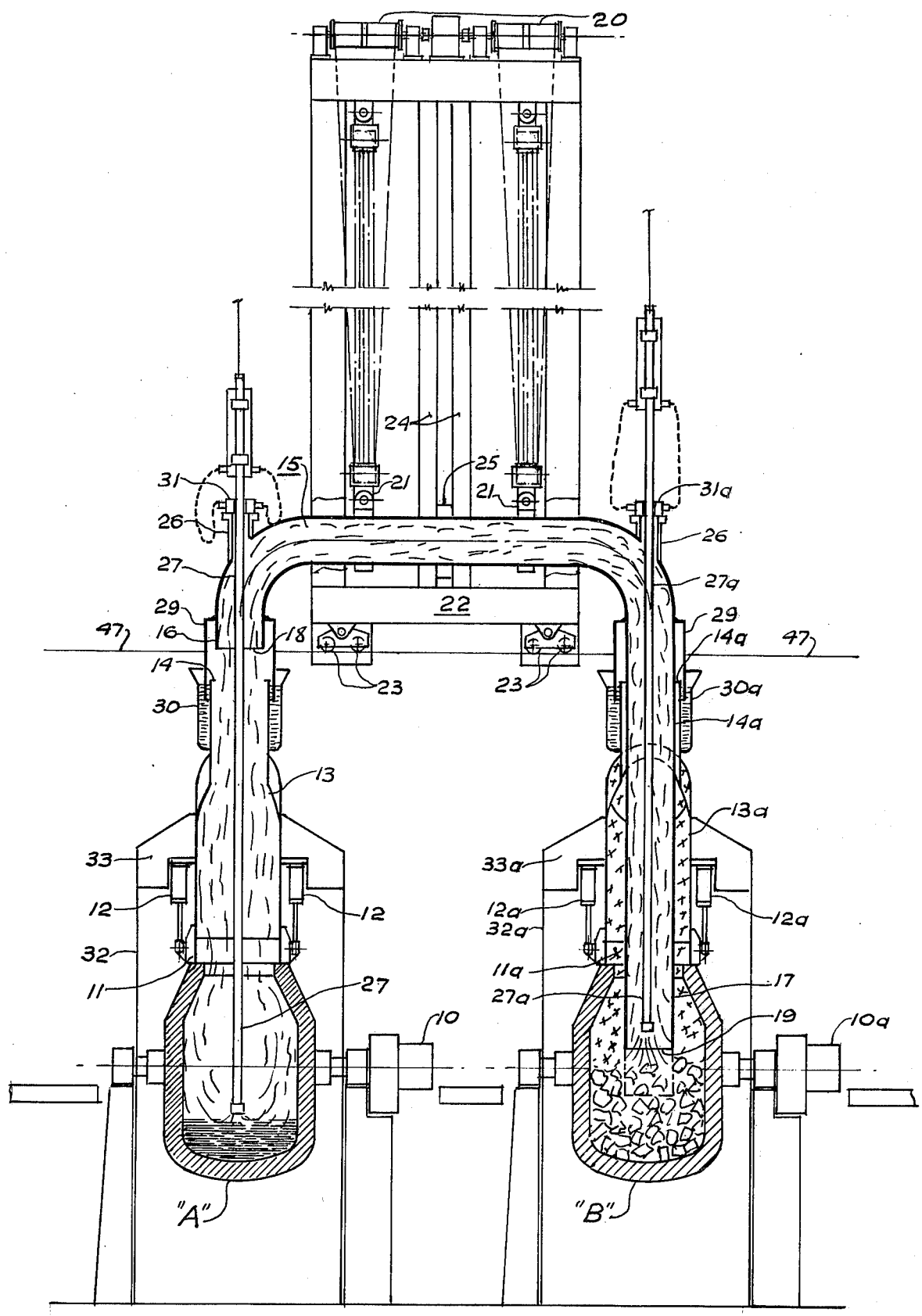
FIG. 1 is a section through the dual furnaces showing the first furnace "A" and the second furnace "B", with a hood over furnace "A" and a hood over furnace "B". Furnace "A" is in the refining stage while furnace "B" is in the pre-heating stage. The J-duct is shown interconnecting furnace "A" to furnace "B" so the off-gas from "A" is forced to "B" and the carriage which handles the J-duct is overhead.
Figure 2:
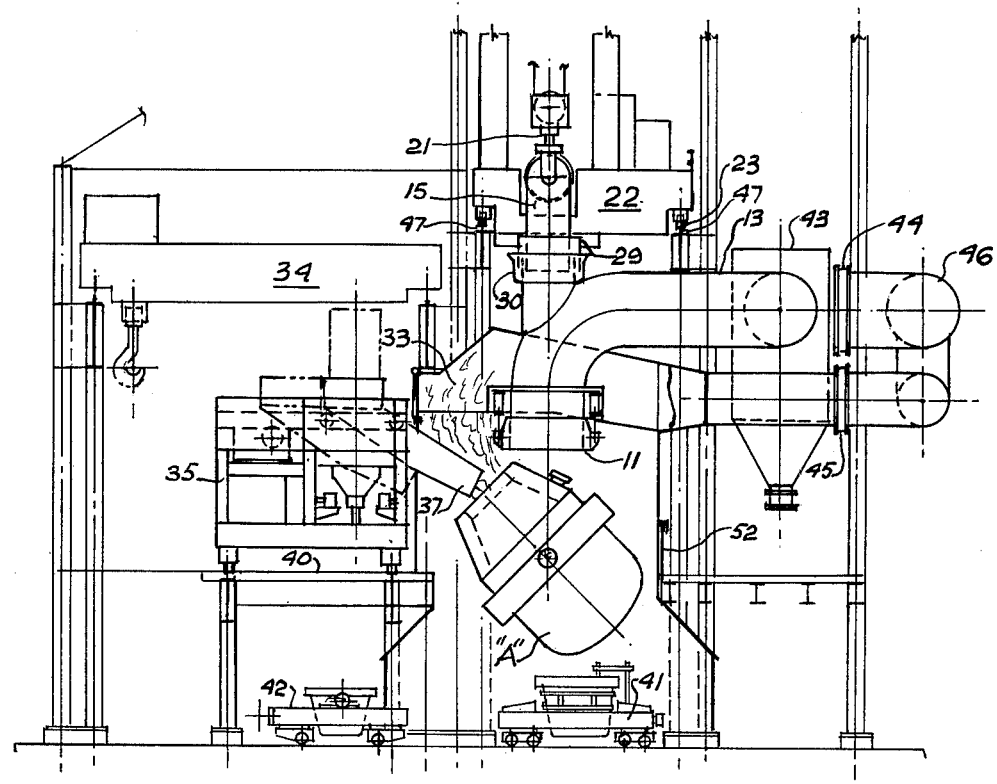
FIG. 2 is a partial section through the shop showing furnace "A" ambushed in the furnace aisle for efficient collection of fugitive emissions and reclined in position taking the cold charge after having been emptied of its heat. The system of fume collection is also shown and the machine for charging is shown reaching the mouth of furnace "A".
Figure 3:
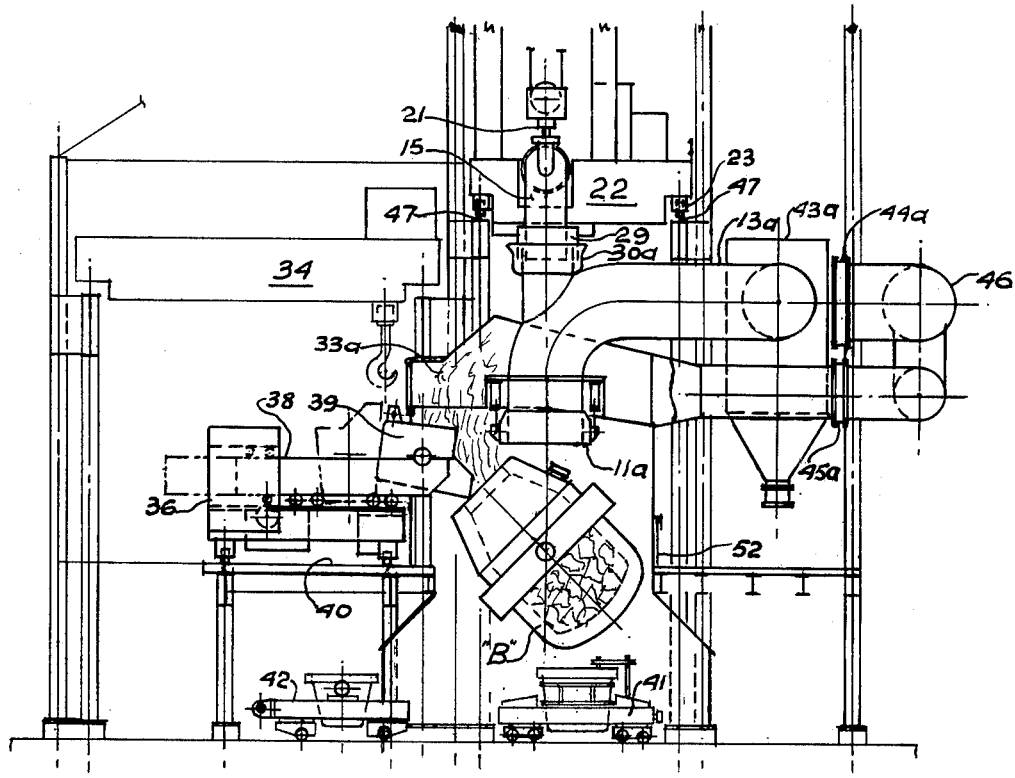
FIG. 3 is a partial section through the shop showing furnace "B" also ambushed in the furnace aisle for efficient collection of fugitive emissions and reclined in position taking the molten pig-iron with the pre-heated scrap in it. The system of fume collection is also shown and the machine for charging is shown reaching the mouth of furnace "B" with the ladle.
Figure 4:
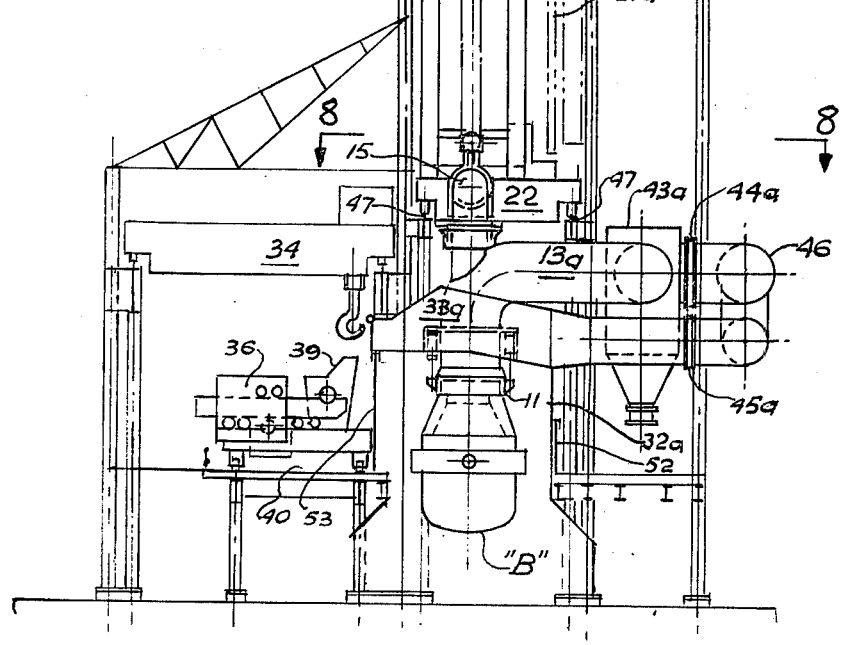
FIG. 4 is a section through the shop showing furnace "B" in the vertical position and in the process of refining with the ladle of molten pig-iron empty and retracted in position for the hot-metal crane to lift it off the molten pig-iron charging machine.

In FIG. 1 reference letter "A" represents one furnace and "B" represents the second furnace. Furnace "A" and Furnace "B" are the dual furnaces and they complement each other when the offgas is used but when the off-gas is not used as in the case when either furnace is down for reline the gases from the operating furnace which is not on reline operates as a conventional basic oxygen furnace and independently and the gases are handled in a conventional fashion. Both Furnaces "A" and "B" are of the conventional type and furnace "A" possesses drive 10 and furnace "B" drive 10a to effect the rotation of furnace "A" and furnace "B" respectively. Above Furnace "A" and above Furnace "B" a shirt represented by numeral 11 and 11a are provided to drop over the mouth of each furnace, skirt 10 over furnace "A" and skirt 10a over furnace "B", in order to restrict air infiltration into the system. Skirt 11 and 11a are equipped with mechanism 12 and 12a for raising and lowering from hood 13 and 13a. Fume hood 13 is positioned overhead of furnace "A" and fume hood 13a is positioned over furnace "B". Both hoods 13 and 13a take the shape of elbows as shown by FIGS. 2, 3 and 4. Rising from hood 13 and 13a extensions 14 and 14a are provided as entry points for Furnace "A" and Furnace "B" through hood 13 and 13a respectively. Duct 15 which assumes the shape of an inverted J, Interconnects furnace "A" to furnace "B" through entry points 14 and 14a. This duct hereinafter called "J-duct 15" possesses short leg 16 and long leg 17; its short leg in turn possesses a gas entry port at 18 and a gas discharge port at 19. Hoist 20 preferably is equipped with cables attached to points 21 on J-duct 15 so that it can be raised and lowered. Also preferably, hoist 20 is mounted on carriage 22 which carriage runs on truck wheels 23 along runway 47. Guides 24 are provided in order to insure the vertical hoisting and lowering of J-duct 15 with proper alignment, this being accomplished by providing block 25 on J-duct 15 to engage guides 24. At the elbows of short leg 16 and long leg 17 entry points 26 are provided by J-duct 15 for the entry of oxygen lances 27 and 27a, both lances being equipped with hoisting mechanism 28 shown on FIG. 4. Seals 31 and 31a are provided to lances 27 and 27a respectively to seal entry points 26 of J-duct 15. J-duct 15 also possesses skirt 29 on each of its legs in order to immerse into water seals 30 and 30a which are mounted to extension 14 and 14a respectively. Skirts 11 and 11a, hoods 13 and 13a, J-duct 15 and oxygen lances 27 and 27a are water cooled.

Furnace "A" and Furnace "B" are wrapped by enclosure 32 and 32a respectively, and each of the enclosures is equipped with an overhead plenum, enclosure 32 with plenum 33 and enclosure 32a with plenum 33a. These plenums are under suction when either of the furnaces is rotated from the blowing position so emissions escaping from the mouth of either furance "A" or furnace "B" are collected, and also to take care of all kinds of fugitive emissions during the servicing of either furnace including charging and blowing.

Figure 8:
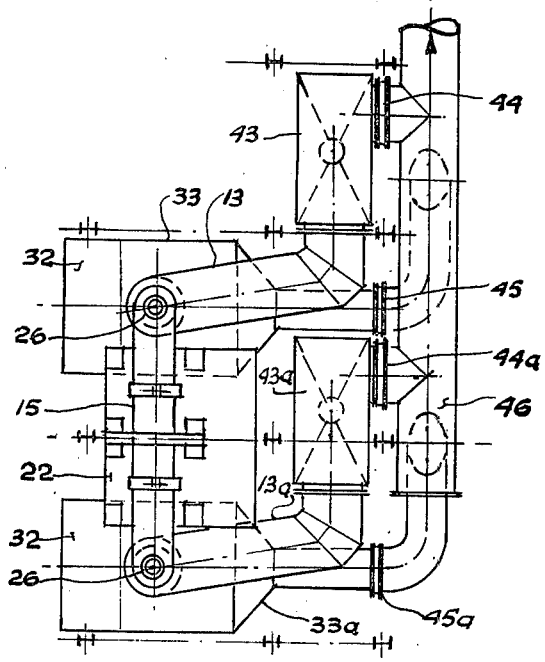
FIG. 8 is a plan view showing the duct system for the blowing and fugitive hoods with the appropriate dampers for control.

Referring to FIGS. 2 and 3 which show partial sections of the shop, crane 34 runs on a runway and is used to serve scrap charging machine 35 and molten pig-iron charging machine 36. Charging machine 35 is equipped with a telescoping chute 37 to reach the mouth of furnace "A" and machine 36 is equipped with a telescoping carriage 38 in order to have ladle 39 reach mouth of furnace "B". Both machines 35 and 36 run on rails imbedded in charging floor 40 in order to make possible for both machines to service both furnaces "A" and "B". Steel ladle 41 and slag pot 42 service furnace "A" and furnace "B". Hood 13 connects to spark box 43 and hood 13a to spark box 43a. The temperature of the gases is controlled in 43 and 43a depending upon which furnace is doing the pre-heating. At the exit point of spark box 43, damper 44 is provided and at the exit point of spark box 43a, damper 44a is provided. These dampers control the suction selectively over the mouth of furnaces "A" and "B". Plenum 33 is equipped with damper 45 and plenum 33a is equipped with damper 45a. Referring to FIG. 8 both hoods 13 and 13a and both plenums 33 and 33a tie to common duct 46 except that hoods 13 and 13a go through spark box 43 and 43a respectively before entry to common duct 46 which duct leads to the scrubber or precipitator for gas cleaning (the scrubber or precipitator are not shown).

Figure 7:
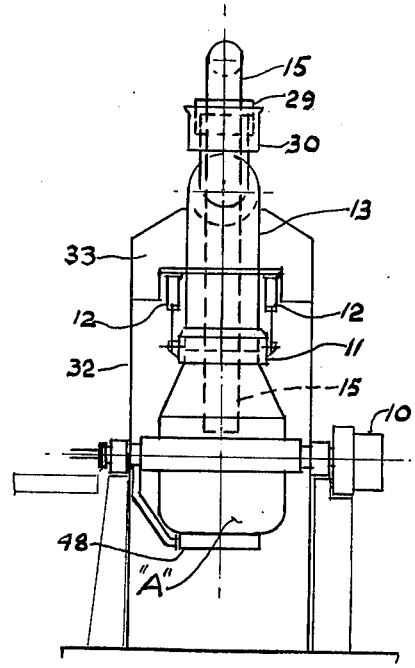
FIG. 7 is a partial view showing furnace "B" with air or oxygen being introduced from the bottom.

Instead of introducing oxygen or air through or into J-duct 15, reference is made to FIG. 7 wherein Furnace "A" is provided with entry point 48 at the bottom thereof for the introduction of oxygen or air for burning the off-gas for pre-heating within the furnace. The entry of the oxidant from the bottom is another method of introducing oxygen to mix with the off-gas introduced by J-duct 15 shown in dotted.

Furnaces must be relined periodically and during this relining period pre-heating cannot take place. Cover 49 is provided to close entry point 14 in order to use Furnace "A" without pre-heat while "B" is being relined or to use "B" furnace with cover 49 for refining while "A" is being relined and the pre-heating step is obviated when "A" is on reline. Cover 49 possesses guide 50 and entry point 51 for the guidance of lance 27 into the furnace doing the refining.

In FIGS. 2, 3 and 4 gates 52 on the tapping side and 53 on the charging side are provided to enclosures 32 and 32a for access purposes.

OPERATION

While the operation of the method and apparatus of the present invention may be comprehended from a study of the foregoing description it is believed that the operation may be further explained as hereinafter set forth.

Referring to FIG. 1 and assuming that Furnace "A" is in the process of refining, Furnace "B" is in the process of pre-heating as oxygen from lance 27 is blown in Furnace "A". The off-gas generated in "A" leaves the mouth of Furnace "A" and into hood 13 whence it enters J-duct 15 through entry point 18 of short leg 16 and in this fashion the gas is forced along the horizontal section of J-duct 15 down long leg 17 and exit from point 19 within Furnace "B". This off-gas which may have a temperature of 4000° mixes with the oxygen introduced into the long leg of J-duct 15 by means of lance 27a and burns efficiently with a wide flame over and into the scrap and/or pellets in furnace "B". The off-gas which contains CO burns to $CO_2$ in Furnace "B" thereby releasing appreciable amounts of energy and also transferring into the scrap great quantities of sensible heat from the gas in addition to the heat of combustion released when oxidizing CO to $CO_2$. In order to guarantee that the off-gas is forced from Furnace "A" to Furnace "B" skirt 11 over Furnace mouth "A" is lowered to control air aspiration. The seal in extension 14 prevents leakage from short leg 16 of J-duct 15 by having skirt 29 immersed in water seal 30. The entry point of J-duct 15 for lances 27 and 27a is sealed by 31 and 31a respectively and the entry point 14a of hood 13a for long leg 17 of J-duct 15 is sealed by water seal 30a. The sealing of these various connections insures the direction of the off-gas from Furnace "A" to Furnace "B" so that combustion takes place in the most efficient manner in Furnace "B" and release the energy over and within the scrap. As the oxidization of the off-gas takes place a blow torch effect with a wide coverage is developed within Furnace "B" which bores into the scrap to form a crater. This then makes possible the lowering of J-duct 15 further down into the solid charge for the most efficient transfer of heat into the scrap and protect the lining during preheating. During the lowering of J-duct 15 the seals are maintained to insure the directing of the off-gas from Furnace "A" to Furnace "B". It is preferred to have J-duct 15 mounted on carriage 22 which is equipped with adequate guidance and hoisting mechanism for the location of J-duct 15 in a proper relationship with Furnace "A" and Furnace "B" and the maintenance of the proper height of J-duct 15 so that: (a) It does not get damaged from protruding scrap, and, (b) it is adapted to be lowered over the scrap and/or pellets for the most effective heat transfer of the oxidized off-gas into the scrap and/or pellets. The exhaust gases after combustion in Furnace "B" escape around the periphery of long leg 17 of J-duct 15 at the mouth of Furnace "B" and the gases are sucked into elbow hood 13a thence to spark box 43a shown in FIG. 8, where the temperature of the gas is dropped and thence into common duct 46 which is under suction at all times.

To minimize air infiltration into hood 13a skirt 11 is adjusted to the proper height. At the conclusion of the refining period in Furnace "A" lance 27 is raised out of Furnace "A" and skirt 11 is raised also, so that Furnace "A" can be rotated. Damper 45 is open and damper 44 is closed in order to effect a negative draft in plenum 33 so that fugitive emissions during temperature and sample taking and during tapping and slagging are collected within enclosure 32 and directed into common duct 46. After having taken the temperature and the samples of the refined steel in Furnace "A" and the heat is found to be within specification, Furnace "A" taps the heat into ladle 41 and the slag poured into pot 42 shown in FIGS. 2 and 3. Instead of blowing oxygen for preheating into furnace "B" to oxidize the off-gas, air may be used. Having completed the cycle of refining in "A" and the cycle of pre-heating in "B" and emptied the heat from Furnace "A", Furnace "A" is in position to take the cold charge as shown by FIG. 2.

During the charging of the scrap and/or pellets into Furnace "A" which is reclined the fugitive emissions are sucked into plenum 33 and directed into common duct 46 and at the conclusion of charging scrap and/or pellets both oxygen lances 27 and 27a are completely raised by hoist 28 and moved by lance carriage 53 to the position shown in fantom on FIG. 4. J-duct 15 is also hoisted by overhead carriage 22 which is in position shown by FIG. 5. Carriage 22 is then free to move to position "Aa" shown in FIG. 6 and a second carriage 22 shown by FIG. 5 in outline in position "Bb", and carrying a second J-duct 15 opposite hand to J-duct 15 shown in the "Aa" position, stations itself over Furnaces "A" and "B" to assume position "Bb" as shown in FIG. 6. J-duct 15 is lowered so that the long leg thereof is inside Furnace "A" while the short leg thereof is above Furnace "B".

Damper 45 of plenum 33 is closed and damper 45a of plenum 33a is opened. Furnace "B" is then reclined to receive the molten pig-iron charge from machine 36 as shown by FIG. 3. The emissions created during the charging of the molten pig iron are sucked into plenum 33a and directed into common duct 46 and at the conclusion of the charging of molten metal and the ladle of molten pig iron which generally continues to smoke for a little while after the completion of the charge, is left under plenum 33a while Furnace "B" is rotated to its upright position. At this point both Furnace "A" and "B" are in there upright position and skirts 11 and 11a are respectively dropped on the mouths of Furnace "A" and Furnace "B". J-duct 15 is lowered as shown by FIG. 6 so that the long leg of J-duct 15 is inside Furnace "A" and the short leg thereof is over Furnace "B". The proper seals are maintained at 30 and 30a. Lances 27 and 27a are lowered and oxygen is blown in Furnace "B" where the charge was pre-heated in the previous cycle, and the off-gas is then diverted from Furnace "B" to Furnace "A" as shown by FIG. 6. In this fashion the refining takes place in Furnace "B" and the preheating in Furnace "A" but before blowing oxygen begins from lance 27 and 27a in FIG. 6, damper 45a is closed and damper 44a is open, these dampers being shown in FIG. 3 and FIG. 8 At the conclusion of the refining cycle in Furnace "B" and pre-heating in Furnace "A" as shown in FIG. 6, the process is reversed by tapping Furnace "B" and charging cold scrap and/or pellets into it and moving carriage 22 to position "Bb" in FIG. 5 while moving carriage 22 in FIG. 6 from position "Aa" to over Furnace "A" and Furnace "B" shown in FIG. 5, and charging molten pig-iron over the hot-scrap in Furnace "A" so that refining takes place in Furnace "A" and pre-heating in Furnace "B".

By following this procedure, the reversal from furnace to furnace is rapid and the pre-heated scrap is not moved by being able to make the steel with the preheated scrap in situ. By providing this improvement to make use of the off-gas from basic oxygen steelmaking furnaces, the following advantages will ensue:

(a) The heat is recovered in the most efficient method and immediately put to use to help the great shortage of molten pig iron.

(b) The apparatus for diverting the off-gas from one furnace to the other minimizes loss of off-gas and preventing of its temperature drop.

(c) The basic oxygen steelmaking process becomes flexible.

(d) Thermoshock to refractories of furnace is minimized.

(e) Pollution control of fugitive emissions is made possible.

It is to be noted that instead of sealing the furnace doing the refining by means of skirt 11 or skirt 11a to minimize the aspiration of air, both skirts 11 and 11a may be eliminated and do the refining with an open hood in order to burn the CO to $CO_2$ within the hood located over the refining furnace, and direct the burnt off-gas to the furnace doing the pre-heating without the addition of oxygen or air within the furnace doing the pre-heating.

All in all it is submitted that the present invention provides an improved method for making use of the off-gas and improved apparatus for putting said improved method into practice; both of these being improvements over the aforementioned application and the issued French patent of the applicant.

I claim:

1. In the conservation of energy from the off-gas generated during refining of steel in the basic oxygen steel-making process wherein the concept of dual furnaces is employed, the first furnace doing the refining and the second furnace doing the pre-heating of the solid charge for the subsequent heat by means of the energy contained in said off-gas, the improved method of providing ducting means to direct said off-gas from the mouth of said first furnace doing the refining through the mouth of said second furnace doing the pre-heating in such a way that the discharge end of said ducting means is within said second furnace and in close proximity to the solid charge within said second furnace for the efficient transferrence of the heat energy from said off-gas to said solid charge, in order to guarantee the impingment of said off-gas on top of said solid charge for the efficient transferrence of the heat energy from said off-gas to said charge, and reacting said off-gas with an oxidizing agent in order to transfer to said solid charge with said second furnace the sensible heat contained in said off-gas and also the energy released from the combustion of said off-gas.

2. The method as set forth in claim 1 wherein the oxidizing agent to cause said off-gas to burn mixes with said off-gas at a location within said second furnace in order to effect a burner-like arrangement to cast heat over said solid charge.

3. The method as set forth in claim 1 wherein said ducting means includes seals at various joints to minimize aspiration of air or leakage of off-gas.

4. In the conservation of energy from the off-gas generated during refining of steel in the basic oxygen steel-making process wherein the concept of dual furnaces is employed, the first furnace doing the refining and the second furnace doing the pre-heating of the solid charge for the subsequent heat by means of the energy contained in said off-gas, the improved method of forcing the off-gas from said first furnace doing the refining into said second furnace doing the pre-heating by the step of providing means comprising a duct having the shape of an inverted J and possessing a short leg and a long leg, said short leg communicating with fume hood means on top of said first furnace doing the refining and said long leg being inserted through fume hood means and into said second furnace doing the pre-heating and into close proximity with the solid charge within said second furnace in order to guarantee the direction of the off-gas from said first furnace to said second furnace and on top of said solid charge for the efficient transferrence of the heat energy from said off-gas to said solid charge, and reacting said off-gas with an oxidizing agent in order to transfer to said solid charge with said second furnace the sensible heat contained in said off-gas and also the energy released from the combustion of said off-gas.

5. The method as set forth in claim 4 wherein an oxidizing agent is introduced into said long leg of said inverted J-duct in order to make possible the combustion of the off-gas substantially at the exit extremity of said long leg of said J-duct within said second furnace.

6. The method as set forth in claim 5 wherein said J-duct is sealed at the connections between hood means of first furnace and hood means of said second furnace in order to guarantee the direction of said off-gas from said first furnace to said second furnace and prevent air aspiration into said J-duct.

7. The method as set forth in claim 6 wherein said J-duct is adapted to be raised and lowered to conform to the level of the pre-heated charge within said second furnace doing the pre-heating.

8. The method as set forth in claim 7 wherein it is provided for a second J-duct means being opposite-handed of said J-duct, so that the short leg thereof and the long leg thereof are adaptable to interconnect said first furnace to said second furnace in such a manner that the long leg of said second J-duct is introduced into said first furnace for pre-heating and said short leg over said second furnace for refining to make possible the reversal of the system.

9. The method as set forth in claim 8 where the interchange of said opposite-handed J-duct means being accomplished by overhead carriage means adapted to handle said J-duct means to direct the off-gas from said first furnace to said second furnace when said first furnace is refining and said second furnace is preheating, and directing said offgas from said second furnace to said first furnace when said second furnace is refining and said first furnace is preheating.

10. The method as set forth in claim 9 wherein the oxidizing agent to burn the off-gas in said furnace doing the refining and preheating is introduced from the bottom of said furnace.

11. The method as set forth in claim 9, wherein during the relining period performed on said first furnace, said second furnace is used to make basic oxygen steel as conventionally done and obviating the step of preheating within said first furnace, and during the relining period performed on said second furnace, said first furnace is used to make steel as conventionally done and obviating the step of preheating within said second furnace.

12. In the conservation of energy by utilization of the off-gas generated during refining of steel in the basic oxygen steel making process wherein the concept of dual furnaces is employed, the first furnace doing the refining and the second furnace doing the preheating of the solid charge for the subsequent heat by means of the energy contained in said off-gas, improved apparatus means consisting of a first rotatable furnace means wherein oxygen is blown for refining the molten pig-iron and solid charge to result in the generation of off-gas, a second rotatably furnace means for preheating the solid charge for the subsequent heat, a duct means interconnecting said first furnace means to said second furnace means in such a manner that a portion of said duct means is associated with the mouth of said first furnace to receive the off-gas and a portion of said duct means extends through the mouth of said second furnace and into said second furnace means to direct said off-gas over said solid charge in order to transfer the heat energy from the off-gas into said solid charge efficiently, and means for evacuating and treating gases from said second furnace means after the impingement of the offgas over said solid charge within said second furnace.

13. The invention as set forth in claim 12, wherein said duct means directing the off-gas generated is adapted for reversal when refining takes place in said second furnace means and preheating of said solid charge in said first furnace means in order to direct the off-gas from said second furnace means to said first furnace means.

14. In the conservation of energy by utilization of the off-gas generated during refining of steel in the basic oxygen steel making process wherein the concept of dual furnaces is employed, the first furnace doing the refining and the second furnace doing the preheating of the solid charge for the subsequent heat by means of the energy contained in said off-gas, improved apparatus means consisting of a first rotatable furnace means wherein oxygen is blown for refining the molten pig-iron and solid charge to result in the generation of off-gas, a second rotatable furnace means for preheating the solid charge for the subsequent heat, a duct means interconnecting said first furnace means to said second furnace means in such a manner that a portion of said duct means is introduced within said second furnace means to direct said off-gas over said solid charge in order to transfer the heat energy from the off-gas into said solid charge efficiently, said duct means is adapted for reversal when refining takes place in said second furnace means and preheating of said solid charge in said first furnace means in order to direct the off-gas from said second furnace means to said first furnace means, adjustment means for moving said duct means vertically in order to bring the exit extremity of said duct means in close proximity to the solid charge within said second furnace where the preheating takes place, and means for evacuating and treating gases from said second furnace means after the impingement of the off-gas over said solid charge within said second furnace.

15. The invention as set forth in claim 14 wherein said duct means possesses the shape of an inverted "J" with a short leg and a long leg, the off-gas entering into said duct means from said furnace means doing the refining through said short leg thereof and emerging from said duct means into said furnace means doing the preheating through said long leg thereof.

16. The invention as set forth in claim 15 wherein means for the introduction of an oxidizing agent is provided to burn the off-gas prior to its entry into said short leg.

17. The invention as set forth in claim 15 wherein seal means are provided at joint portions of said duct means and both of said furnace means in order to prevent off-gass from escaping and air aspiration into the system.

18. The invention as set forth in claim 15 wherein means is provided for the introduction of an oxidizing agent into said long leg in order to burn the off-gas efficiently within said furnace means doing the preheating and in this manner transfer the maximum amount of heat energy into the solid charge within said furnace means doing the preheating.

19. In the conservation of energy by utilization of the off-gas generated during refining of steel in the basic oxygen steel making process wherein the concept of dual furnaces is employed, the first furnace doing the refining and the second furnace doing the preheating of the solid charge for the subsequent heat by means of the energy contained in said off-gas, improved apparatus means consisting of a first rotatable furnace means wherein oxygen is blown for refining the molten pig-iron and solid charge to result in the generation of off-gas, a second rotatable furnace means for preheating the solid charge for the subsequent heat, a first duct means used to interconnect said first furnace means where refining takes place to said second furnace means where preheating takes place, in such a manner that a portion of said first duct means is introduced within said second furnace means to direct said off-gas over said solid charge to be preheated within said second furnace means in order to transfer the heat energy from the off-gas into said solid charge efficiently, a second duct means opposite-handed to said first duct means used to interconnect said first furnace means where preheating takes place, to said second furnace means where refining takes place, in such a manner that a portion of said second duct means is introduced within said first furnace means to direct said off-gas over said solid charge to be preheated within said first furnace means in order to transfer the heat energy from the off-gas into said solid charge efficiently, said first duct means being used in conjunction with said first furnace means doing the refining and said second furnace means doing the preheating, and said second duct means being used in conjection with said first furnace means doing the preheating and said second furnace means doing the refining and means for evacuating and treating gases from said second furnace means after the impingement of the off-gas over said solid charge within said second furnace.

20. The invention as set forth in claim 19 wherein said first duct means and said second duct means are adapted to be raised and lowered independently optimum heat transfer to said solid charge.

21. The invention as set forth in claim 19, wherein said first duct means and said second duct means are independently disposed to carriage means equipped with independent hoisting means in order to effect the reversal of said dual furnaces from refining to preheating and vice-versa.

22. The invention as set forth in claim 21 wherein said carriage means possesses guide means in order to insure the alignment of each of said duct means.

23. The invention as set forth in claim 21 wherein said carriage means comprises two separate and independent carriages, each carriage handling a single duct means.

24. The invention as set forth in claim 19 wherein said duct means have water cooling provisions to maintain the integrity of said duct means.

* * * * *